(12) United States Patent
Takiguchi et al.

(10) Patent No.: US 9,727,024 B2
(45) Date of Patent: Aug. 8, 2017

(54) PHASE MODULATION METHOD AND PHASE MODULATING DEVICE

(71) Applicant: HAMAMATSU PHOTONICS K.K., Hamamatsu-shi, Shizuoka (JP)

(72) Inventors: Yuu Takiguchi, Hamamatsu (JP); Takashi Inoue, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 84 days.

(21) Appl. No.: 14/441,270

(22) PCT Filed: Nov. 7, 2013

(86) PCT No.: PCT/JP2013/080130
§ 371 (c)(1),
(2) Date: May 7, 2015

(87) PCT Pub. No.: WO2014/073611
PCT Pub. Date: May 15, 2014

(65) Prior Publication Data
US 2015/0309472 A1    Oct. 29, 2015

(30) Foreign Application Priority Data

Nov. 12, 2012  (JP) .................................. 2012-248445

(51) Int. Cl.
*G03H 1/08*    (2006.01)
*G02B 26/06*   (2006.01)
(Continued)

(52) U.S. Cl.
CPC ........... *G03H 1/0841* (2013.01); *G02B 21/06* (2013.01); *G02B 26/06* (2013.01);
(Continued)

(58) Field of Classification Search
CPC .......... G03H 1/08; G03H 1/22; G03H 1/2294; G02F 1/14309
(Continued)

(56) References Cited

U.S. PATENT DOCUMENTS 3,476,463 A    11/1969  Kreuzer
7,324,255 B2 *  1/2008  Tanaka .............. G02F 1/134309
                                                        345/695
(Continued)

FOREIGN PATENT DOCUMENTS

CN        1675597       9/2005
CN        101618637     1/2010
(Continued)

OTHER PUBLICATIONS

Haotong Ma et al., "Generation of flat-top beam with phase-only liquid crystal spatial light modulators," Journal of Optics, Apr. 2010, pp. 1-8, vol. 12, issue 4, Article 045704.

*Primary Examiner* — Audrey Y Chang
(74) *Attorney, Agent, or Firm* — Drinker Biddle & Reath LLP

(57)    ABSTRACT

A phase distribution is calculated such that modulated light has a predetermined intensity distribution on a target plane and displayed on a phase modulation plane, readout light enters the phase modulation plane so as to generate the modulated light. When calculating the phase distribution, a region on the phase modulation plane is divided into N regions $A_1 \ldots A_N$, with sizes set such that integration values of an intensity distribution in the regions are equal to each other. Further, a region on the target plane is divided into N regions $B_1 \ldots B_N$, with sizes set such that integration values of an intensity distribution in the regions are equal to each other. The phase distribution is calculated by obtaining an optical path length from the region $A_n$ to the region $B_n$, and (Continued)

determining the phase of the region $A_n$ based on the optical path length.

16 Claims, 15 Drawing Sheets

(51) Int. Cl.
    *G03H 1/22*     (2006.01)
    *G02B 21/06*     (2006.01)
    *G02B 27/09*     (2006.01)
    *G03H 1/00*     (2006.01)

(52) U.S. Cl.
    CPC ..... *G02B 27/0927* (2013.01); *G02B 27/0944* (2013.01); *G03H 1/0005* (2013.01); *G03H 1/0808* (2013.01); *G03H 1/2294* (2013.01); *G03H 2001/005* (2013.01); *G03H 2001/0094* (2013.01); *G03H 2001/085* (2013.01); *G03H 2001/221* (2013.01); *G03H 2210/20* (2013.01); *G03H 2225/32* (2013.01); *G03H 2225/52* (2013.01)

(58) Field of Classification Search
    USPC ........................ 359/9, 11, 245, 279; 345/695
    See application file for complete search history.

(56) References Cited

U.S. PATENT DOCUMENTS

| | | |
|---|---|---|
| 2004/0145809 A1 | 7/2004 | Brenner |
| 2005/0275919 A1 | 12/2005 | Tanaka et al. |
| 2010/0000978 A1 | 1/2010 | Matsumoto et al. |

FOREIGN PATENT DOCUMENTS

| | | |
|---|---|---|
| JP | 2003-121749 A | 4/2003 |
| JP | 2004-069920 A | 3/2004 |
| JP | 2004-531760 A | 10/2004 |
| JP | 2007-523359 A | 8/2007 |
| JP | 2012-022252 A | 2/2012 |
| WO | WO 2005/059881 | 6/2005 |

\* cited by examiner

PHASE MODULATION METHOD AND PHASE MODULATING DEVICE

TECHNICAL FIELD

The present invention relates to a phase modulation method and a phase modulation apparatus.

BACKGROUND ART

Patent Document 1 describes a microscope including means for illuminating a test object. This microscope includes illuminating means that irradiates a test object with light from a light source to generate a light flux containing information on the test object, illumination light modulation means that modulates the light with which the test object is irradiated in wavelength etc., and pupil modulation means that is provided near a pupil plane of an objective lens, and modulates the light flux containing information on the test object in phase etc. The pupil modulation means is configured by a liquid crystal type spatial light modulation element.

CITATION LIST

Patent Literature

Patent Document 1: Japanese Patent Application Laid-Open No. 2003-121749

SUMMARY OF INVENTION

Technical Problem

Recently, it has been studied to generate illumination light for an object in microscopy or laser light for use in laser processing by phase modulation using a spatial light modulator. In illumination of an object in microscopy, illumination light having a desired intensity distribution in, for example, a circular ring shape can be realized by controlling a phase distribution (hologram) in the spatial light modulator. Further, in use for laser processing, a processing object can be irradiated with laser light having a desired intensity distribution in, for example, a top hat shape by controlling a phase distribution in the spatial light modulator. However, in the conventional device, it has been necessary to determine a phase distribution by a complicated calculation in order to realize a desired intensity distribution with high accuracy, and a method that can simply determine a phase distribution has been demanded.

It is an object of the present invention to provide a phase modulation method and a phase modulation apparatus capable of simply determining a phase distribution for realizing a desired intensity distribution with high accuracy.

Solution to Problem

A phase modulation method according to one embodiment is a phase modulation method for modulating readout light, of which an intensity distribution in an arbitrary section including an optical axis is axially symmetric with respect to the optical axis, in phase in each of the plurality of regions to generate modulated light, using a spatial light modulator having a phase modulation plane including a plurality of two-dimensionally arrayed regions, and includes a phase distribution calculation step of calculating a phase distribution to be displayed on the phase modulation plane such that the modulated light has a predetermined intensity distribution on a target plane separated by a predetermined optical distance from the phase modulation plane, and a modulated light generation step of displaying the phase distribution on the phase modulation plane, and causing the readout light to enter the phase modulation plane so as to generate the modulated light, in which the phase distribution calculation step includes a step of dividing a region on the phase modulation plane which the readout light enters into N (N is an integer of 2 or more) concentric regions $A_1 \ldots A_N$ centered on an optical axis of the readout light and setting sizes of the regions $A_1 \ldots A_N$ such that integration values of an intensity distribution in the regions $A_1 \ldots A_N$ in a section including the optical axis of the readout light are equal to each other, and dividing a region on the target plane into N concentric regions $B_1 \ldots B_N$ centered on an optical axis of the modulated light and setting sizes of the regions $B_1 \ldots B_N$ such that integration values of an intensity distribution in the regions $B_1 \ldots B_N$ in a section including the optical axis of the modulated light are equal to each other, and a step of calculating the phase distribution by obtaining an optical path length $L_n$ from the region $A_n$ to the region $B_n$ (n is each of integers from 1 to N), and determining a phase of the region $A_n$ based on the optical path length $L_n$.

Further, in this phase modulation method, the phase distribution calculation step may further include a measurement step of measuring the intensity distribution in the section including the optical axis of the readout light which enters the phase modulation plane. Further, in this phase modulation method, an optical path of the modulated light from the phase modulation plane to the target plane may consist of a void.

Further, a first phase modulation apparatus according to one embodiment includes a light source outputting readout light of which an intensity distribution in an arbitrary section including an optical axis is axially symmetric with respect to the optical axis, a spatial light modulator having a phase modulation plane including a plurality of two-dimensionally arrayed regions, and modulating the readout light in phase in each of the plurality of regions to generate modulated light, and a phase distribution computation unit calculating a phase distribution to be displayed on the phase modulation plane such that the modulated light has a predetermined intensity distribution on a target plane separated by a predetermined optical distance from the phase modulation plane, in which the phase distribution computation unit calculates the phase distribution to be displayed on the phase modulation plane by dividing a region on the phase modulation plane which the readout light enters into N (N is an integer of 2 or more) concentric regions $A_1 \ldots A_N$ centered on an optical axis of the readout light and setting sizes of the regions $A_1 \ldots A_N$ such that integration values of an intensity distribution in the regions $A_1 \ldots A_N$ in a section including the optical axis of the readout light are equal to each other, dividing a region on the target plane into N concentric regions $B_1 \ldots B_N$ centered on an optical axis of the modulated light and setting sizes of the regions $B_1 \ldots B_N$ such that integration values of an intensity distribution in the regions $B_1 \ldots B_N$ in a section including the optical axis of the modulated light are equal to each other, obtaining an optical path length $L_n$ from the region $A_n$ to the region $B_n$ (n is each of integers from 1 to N), and determining a phase of the region $A_n$ based on the optical path length $L_n$.

Further, the first phase modulation apparatus may further include a measurement section measuring the intensity distribution in the section including the optical axis of the readout light which enters the phase modulation plane.

Further, a second phase modulation apparatus according to another embodiment includes a light source outputting readout light of which an intensity distribution in an arbitrary section including an optical axis is axially symmetric with respect to the optical axis, a spatial light modulator having a phase modulation plane including a plurality of two-dimensionally arrayed regions, and modulating the readout light in phase in each of the plurality of regions to generate modulated light, and a control section controlling a phase distribution to be displayed on the phase modulation plane such that the modulated light has a predetermined intensity distribution on a target plane separated by a predetermined optical distance from the phase modulation plane, in which the control section has a storage unit storing the phase distribution, and the phase distribution is calculated by dividing a region on the phase modulation plane which the readout light enters into N (N is an integer of 2 or more) concentric regions $A_1 \ldots A_N$ centered on an optical axis of the readout light and setting sizes of the regions $A_1 \ldots A_N$ such that integration values of an intensity distribution in the regions $A_1 \ldots A_N$ in a section including the optical axis of the readout light are equal to each other, dividing a region on the target plane into N concentric regions $B_1 \ldots B_N$ centered on an optical axis of the modulated light and setting sizes of the regions $B_1 \ldots B_N$ such that integration values of an intensity distribution in the regions $B_1 \ldots B_N$ in a section including the optical axis of the modulated light are equal to each other, obtaining an optical path length $L_n$ from the region $A_n$ to the region $B_n$ (n is each of integers from 1 to N), and determining a phase of the region $A_n$ based on the optical path length $L_n$.

Further, in the first and second phase modulation apparatuses, an optical path of the modulated light from the phase modulation plane to the target plane may consist of a void. Further, the first and second phase modulation apparatuses may further include an objective lens disposed on the target plane.

Further, a phase modulation method according to another embodiment is a phase modulation method for modulating readout light in phase in each of the plurality of regions to generate modulated light, using a spatial light modulator having a phase modulation plane including a plurality of two-dimensionally arrayed regions, and includes a phase distribution calculation step of calculating a phase distribution to be displayed on the phase modulation plane such that the modulated light has a predetermined intensity distribution on a target plane separated by a predetermined optical distance from the phase modulation plane, and a modulated light generation step of displaying the phase distribution on the phase modulation plane, and causing the readout light to enter the phase modulation plane so as to generate the modulated light, in which the phase distribution calculation step includes a step of calculating a centroid position of an intensity distribution of the readout light, dividing a region on the phase modulation plane which the readout light enters into M (M is an integer of 2 or more) regions $S_1 \ldots S_M$, in a polar coordinate system which takes the centroid position as a center of coordinates, such that integration values of an intensity distribution in the respective regions are equal to each other, calculating a centroid position of an intensity distribution on the target plane, and dividing a region on the target plane which the modulated light enters into M regions $R_1 \ldots R_M$, in a polar coordinate system which takes the centroid position as a center of coordinates, such that integration values of an intensity distribution in the respective regions are equal to each other, and a step of calculating the phase distribution by obtaining an optical path length $LB_m$ from the region $S_m$ to the region $R_m$ (m is each of integers from 1 to M), and determining a phase of the region $S_m$ based on the optical path length $LB_m$.

Further, a third phase modulation apparatus according to still another embodiment includes a light source outputting readout light, a spatial light modulator having a phase modulation plane including a plurality of two-dimensionally arrayed regions, and modulating the readout light in phase in each of the plurality of regions to generate modulated light, and a phase distribution computation unit calculating a phase distribution to be displayed on the phase modulation plane such that the modulated light has a predetermined intensity distribution on a target plane separated by a predetermined optical distance from the phase modulation plane, in which the phase distribution computation unit calculates the phase distribution to be displayed on the phase modulation plane by calculating a centroid position of an intensity distribution of the readout light, dividing a region on the phase modulation plane which the readout light enters into M (M is an integer of 2 or more) regions $S_1 \ldots S_M$, in a polar coordinate system which takes the centroid position as a center of coordinates, such that integration values of an intensity distribution in the respective regions are equal to each other, calculating a centroid position of an intensity distribution on the target plane, dividing a region on the target plane which the modulated light enters into M regions $R_1 \ldots R_M$, in a polar coordinate system which takes the centroid position as a center of coordinates, such that integration values of an intensity distribution in the respective regions are equal to each other, obtaining an optical path length $LB_m$ from the region $S_m$ to the region $R_m$ (m is each of integers from 1 to M), and determining a phase of the region $S_m$ based on the optical path length $LB_m$.

Further, a fourth phase modulation apparatus according to still another embodiment includes a light source outputting readout light, a spatial light modulator having a phase modulation plane including a plurality of two-dimensionally arrayed regions, and modulating the readout light in phase in each of the plurality of regions to generate modulated light, and a control section controlling a phase distribution to be displayed on the phase modulation plane such that the modulated light has a predetermined intensity distribution on a target plane separated by a predetermined optical distance from the phase modulation plane, in which the control section has a storage unit storing the phase distribution, and the phase distribution is calculated by calculating a centroid position of an intensity distribution of the readout light, dividing a region on the phase modulation plane which the readout light enters into M (M is an integer of 2 or more) regions $S_1 \ldots S_M$, in a polar coordinate system which takes the centroid position as a center of coordinates, such that integration values of an intensity distribution in the respective regions are equal to each other, calculating a centroid position of an intensity distribution on the target plane, dividing a region on the target plane which the modulated light enters into M regions $R_1 \ldots R_M$, in a polar coordinate system which takes the centroid position as a center of coordinates, such that integration values of an intensity distribution in the respective regions are equal to each other, obtaining an optical path length $LB_m$ from the region $S_m$ to the region $R_m$ (m is each of integers from 1 to M), and determining a phase of the region $S_m$ based on the optical path length $LB_m$.

Advantageous Effects of Invention

In accordance with the phase modulation method and the phase modulation apparatus of the present invention, a phase distribution for realizing a desired intensity distribution with high accuracy can be simply determined.

DESCRIPTION OF EMBODIMENTS

Hereinafter, embodiments of a phase modulation method and a phase modulation apparatus according to the present invention will be described in detail with reference to the accompanying drawings. In addition, in the description of the drawings, the same elements are denoted by the same reference symbols, and overlapping description will be omitted.

(First Embodiment)

Figure 1:
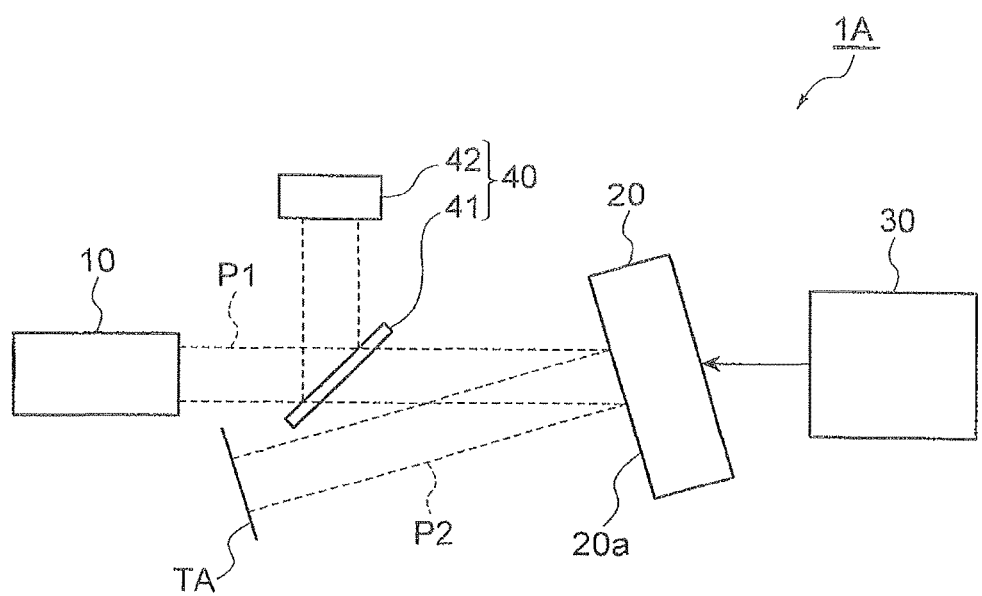
FIG. 1 is a view schematically showing a configuration of a phase modulation apparatus.

FIG. 1 is a view schematically showing a configuration of a phase modulation device 1A according to an embodiment of the present invention. The phase modulation device 1A is an apparatus that irradiates an irradiation object with light, and for example, illuminates an observation object in the case of microscopy, and for example, emits laser light to a processing object in the case of laser processing. As shown in FIG. 1, the phase modulation device 1A of the present embodiment includes a light source 10, a spatial light modulator (Spatial Light Modulator; SLM) 20, a control section 30, and a measurement section 40.

The light source 10 outputs readout light P1 to the spatial light modulator 20. The readout light P1 is light of which an intensity distribution (intensity profile) in an arbitrary section including an optical axis is axially symmetric with respect to the optical axis, and is, for example, laser light having an intensity profile of a Gaussian distribution. Further, the readout light P1 is made parallel (collimated). The light source 10 includes an optical system for collimating the readout light P1.

The spatial light modulator 20 has a phase modulation plane 20a including a plurality of two-dimensionally arrayed regions, and generates modulated light P2 by modulating the readout light P1 in phase in each of the plurality of regions. On the phase modulation plane 20a, a phase distribution (hologram) is displayed according to a control signal provided from the control section 30. The spatial light modulator 20 outputs the modulated light P2 toward a target plane TA that is separated by a predetermined optical distance from the phase modulation plane 20a. Optical components such as lenses are not provided at all between the phase modulation plane 20a and the target plane TA, and an optical path of the modulated light P2 from the phase modulation plane 20a to the target plane TA consists of a void. In addition, in an example, an irradiation object is installed on the target plane TA, and in another example, an objective lens is installed on the target plane TA. Further, in still another example, a 4f telecentric optical system or an imaging optical system such as a zoom lens may be installed on or after the target plane TA.

Figure 2:
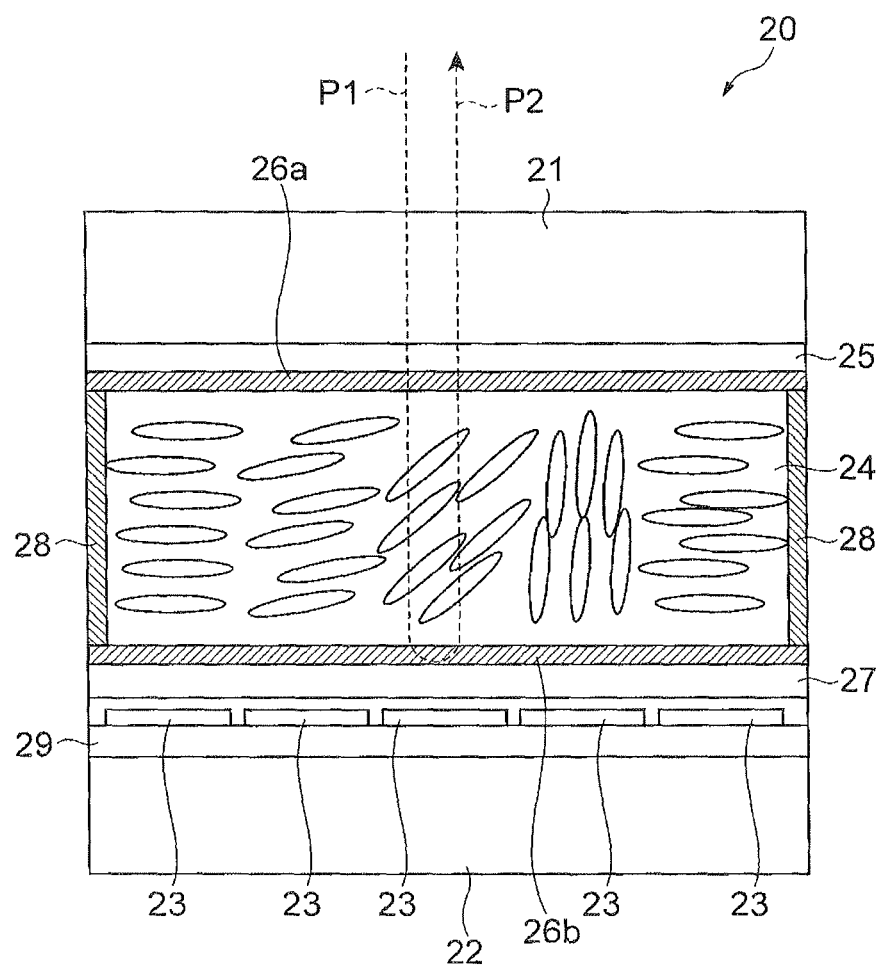
FIG. 2 is a sectional view schematically showing an LCOS type spatial light modulator as an example of a spatial light modulator.

FIG. 2 is a sectional view schematically showing an LCOS type spatial light modulator as an example of the spatial light modulator 20 of the present embodiment, and shows a section taken along the optical axis of the readout light P1. The spatial light modulator 20 includes a transparent substrate 21, a silicon substrate 22, a plurality of pixel electrodes 23, a liquid crystal layer 24, a transparent electrode 25, alignment films 26a and 26b, a dielectric mirror 27, and a spacer 28. The transparent substrate 21 is made of a material that transmits readout light P1, and disposed along a principal surface of the silicon substrate 22. The plurality of pixel electrodes 23 are arrayed in a two-dimensional grid pattern on the principal surface of the silicon substrate 22, and constitute respective pixels of the spatial light modulator 20. The transparent electrode 25 is disposed on a surface of the transparent substrate 21 that is opposed to the plurality of pixel electrodes 23. The liquid crystal layer 24 is disposed between the plurality of pixel electrodes 23 and the transparent electrode 25. The alignment film 26a is disposed between the liquid crystal layer 24 and the transparent electrode 25, and the alignment film 26b is disposed between the liquid crystal layer 24 and the plurality of pixel electrodes 23. The dielectric mirror 27 is disposed between the alignment film 26b and the plurality of pixel electrodes 23. The dielectric mirror 27 reflects the readout light P1 having entered from the transparent substrate 21 and transmitted through the liquid crystal layer 24 so as to output again from the transparent substrate 21.

Further, the spatial light modulator 20 further includes a pixel electrode circuit (active matrix driving circuit) 29 that controls voltages to be applied between the plurality of pixel electrodes 23 and the transparent electrode 25. When voltage is applied to any pixel electrode 23 from the pixel electrode circuit 29, the refractive index of the liquid crystal layer 24 on the pixel electrode 23 changes according to the level of an electric field generated between the pixel electrode 23 and the transparent electrode 25. Thus, the optical path length of the readout light P1 that is transmitted through the relevant portion of the liquid crystal layer 24 changes, and accordingly, the phase of the readout light P1 changes. Moreover, by applying various levels of voltage to the plurality of pixel electrodes 23, a spatial distribution of the phase modulation amount can be electrically written, and various phase distributions (holograms) can be displayed according to necessity.

In addition, the spatial light modulator 20 is not limited to an electrically addressable liquid crystal element as shown in FIG. 2, and may be, for example, an optically addressable liquid crystal element or a deformable mirror type light modulator. Further, a reflection type spatial light modulator 20 is shown in FIG. 2, but the spatial light modulator 20 of the present embodiment may be a transmission type. Further, between the spatial light modulator 20 and the light source 10, an optical system including an optical component such as a beam expander and/or a spatial filter may be provided.

FIG. 1 is referred to again. The measurement section 40 measures an intensity distribution (intensity profile) in a section including the optical axis of the readout light P1 that enters the phase modulation plane 20a. The measurement section 40 has, for example, a beam splitter 41 that disperses the readout light P1 and a one-dimensional or two-dimensional optical sensor 42 that detects an intensity distribution of the readout light P1 dispersed by the beam splitter 41. Data regarding the intensity distribution measured in the measurement section 40 is provided to the control section 30.

Figure 3:
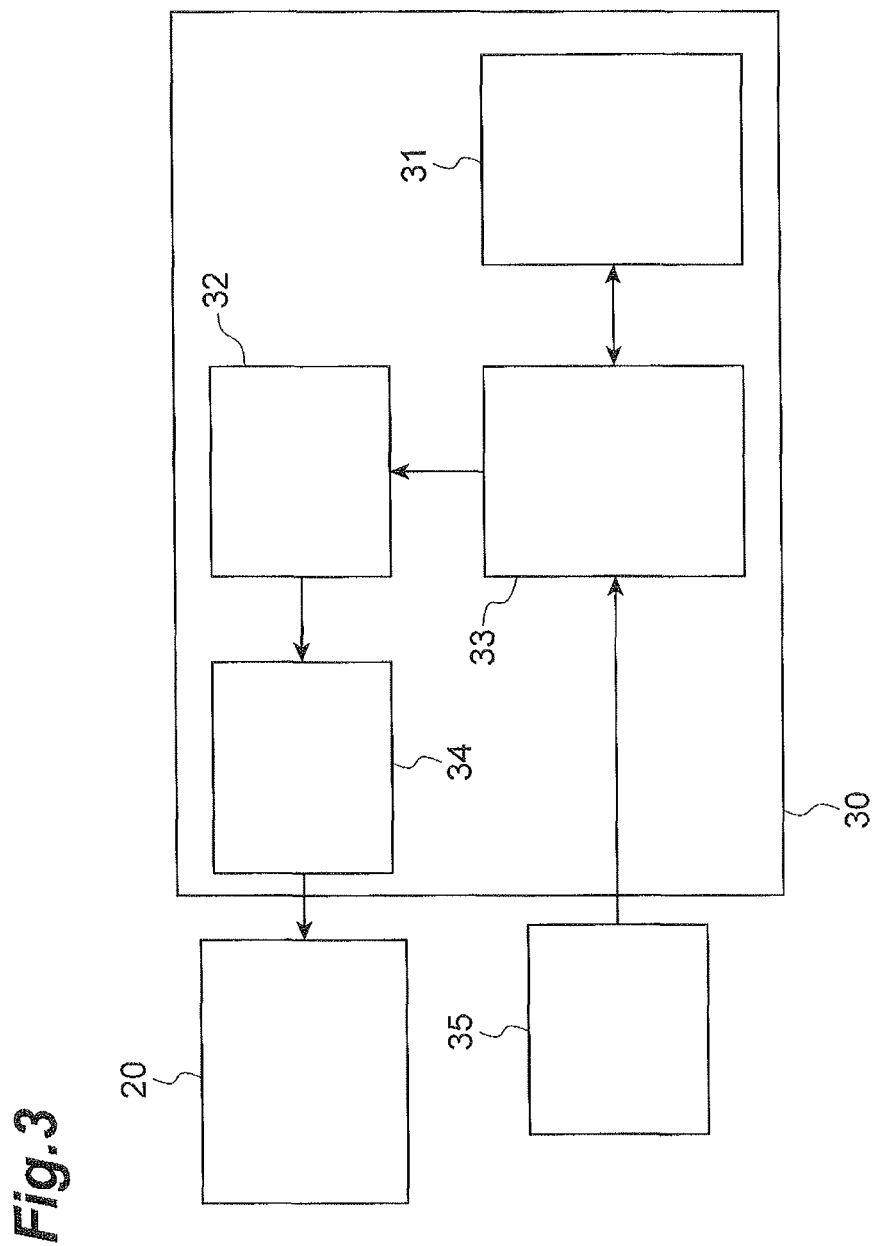
FIG. 3 is a block diagram showing an internal configuration of a control section.

The control section 30 causes the phase modulation plane 20a to display a phase distribution by providing an electrical signal to the spatial light modulator 20 such that the modulated light P2 has a predetermined intensity distribution on the target plane TA. FIG. 3 is a block diagram showing an internal configuration of the control section 30 of the present embodiment. As shown in FIG. 3, the control section 30 has a storage unit 31, a calculation unit 32, a selection unit 33, a drive unit 34, and an external input unit 35.

The storage unit 31 stores data regarding a phase distribution that the phase modulation plane 20a of the spatial light modulator 20 is caused to display. This phase distribution may be one calculated by the calculation unit 32 to be described later, or may be one input to the phase modulation device 1A after being previously calculated in the outside of the phase modulation device 1A. Further, the storage unit 31 may further store data regarding a phase distribution for correcting aberration (phase distortion) generated in the optical system and/or the spatial light modulator 20 provided for the phase modulation device 1A.

In addition, the storage unit 31 may store phase distribution data in a compressed state. In that case, the control section 30 preferably further has a data processing unit for decompressing the data. Further, the storage unit 31 is favorably realized by a storage element (memory) having a certain amount of large volume of capacity. For example, when the phase distribution is an 8-bit image with SVGA resolution (800 pixels×600 pixels), in the case where data is not compressed, a data volume per one piece of phase distribution data is 480 kilobytes. Thus, the storage unit 31 is desirably realized by a storage element having a capacity capable of storing such large volumes of data.

The calculation unit 32 is a phase distribution computation unit in the present embodiment, and calculates a phase distribution to be displayed on the phase modulation plane 20a such that the modulated light P2 has a predetermined intensity distribution on the target plane TA. The calculation unit 32 adds a phase distribution for correcting phase distortion to the thus calculated phase distribution, according to necessity.

The selection unit 33, when the storage unit 31 has stored a plurality of phase distributions, selects one or a plurality of phase distributions based on an instruction from the external input unit 35 such as, for example, a keyboard. The drive unit 34 generates a control signal including a phase distribution provided from the calculation unit 32, and provides the control signal to the spatial light modulator 20. In addition, the storage unit 31, the calculation unit 32, the selection unit 33, and the drive unit 34 included in the control section 30 may be provided separated from each other.

Figure 4:
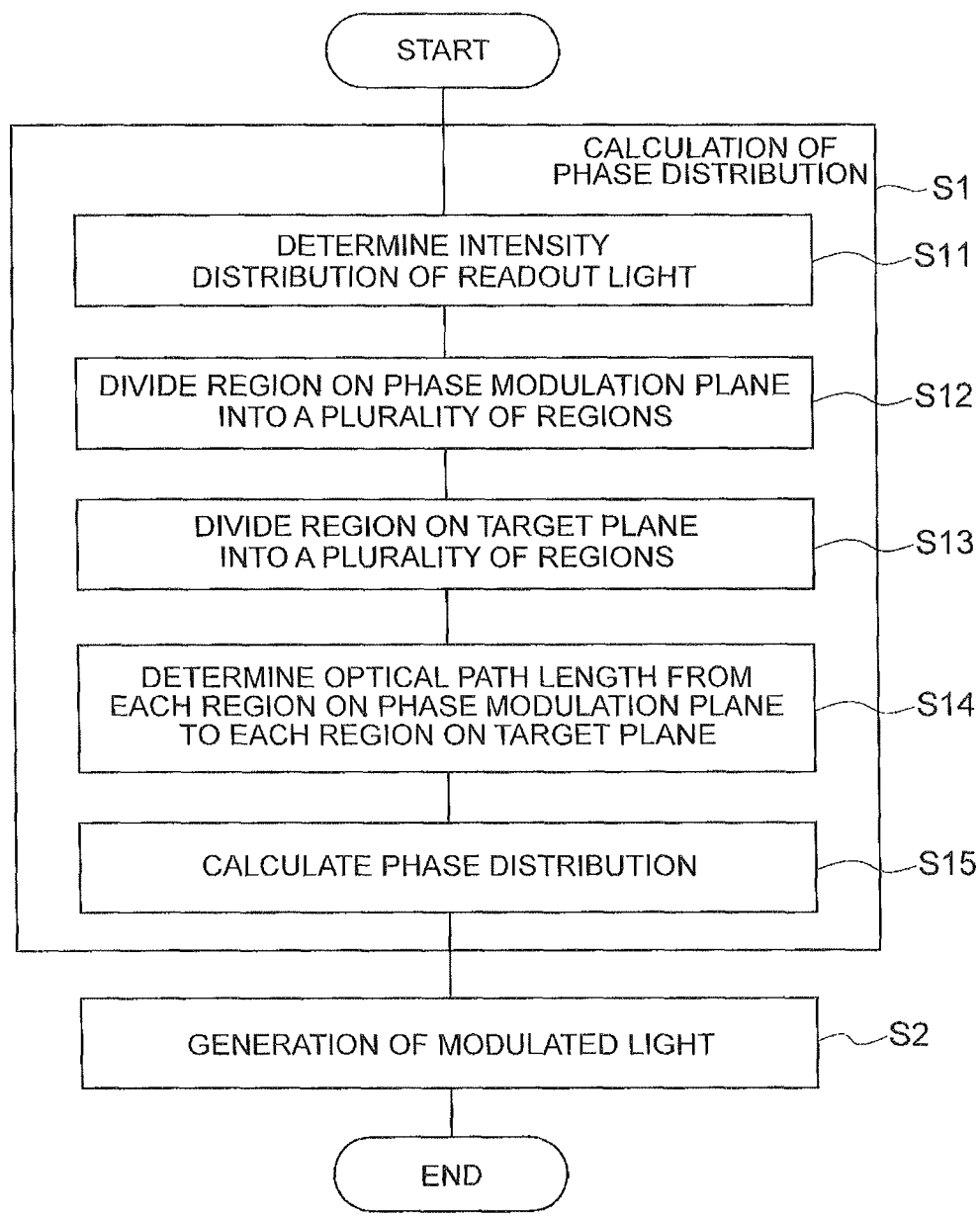
FIG. 4 is a flowchart showing a phase modulation method.

Here, an example of a method for calculating a phase distribution will be described together with a phase modulation method according to the present embodiment. In addition, calculation of a phase distribution to be described in the following may be performed by the calculation unit 32, or may be previously performed in the outside of the phase modulation device 1A. FIG. 4 is a flowchart showing the phase modulation method according to the present embodiment. As shown in FIG. 4, the phase modulation method of the present embodiment includes a phase distribution calculation step S1 and a modulated light generation step S2.

<Calculation of Phase Distribution>

In the phase distribution calculation step S1, a phase distribution to be displayed on the phase modulation plane 20a is calculated such that the modulated light P2 has a predetermined intensity distribution on the target plane TA. The phase distribution that is calculated in the present embodiment is for converting the intensity distribution of readout light P1 an intensity distribution of which in an arbitrary section including an optical axis is axially symmetric with respect to the optical axis (i.e., isointensity lines are in concentric shapes centered on the optical axis) to modulated light P2 similarly having an intensity distribution that is axially symmetric with respect to an optical axis. Thus, in the present embodiment, for simplification of calculation, a phase distribution is calculated based on a one-dimensional intensity distribution in a radial direction of the readout light P1 and the modulated light P2. In addition, in the following description, a point on the optical axis is provided as a coordinate origin, and the unit of a coordinate axis is provided as px (pixel).

In this phase distribution calculation step S1, first, an intensity distribution in a section including the optical axis of the readout light P1 that enters the phase modulation plane 20a is determined (measurement step S11). The intensity distribution of the readout light P1 is determined by the measurement section 40 shown in FIG. 1. In addition, the intensity distribution of the readout light P1 may be previously measured or the intensity distribution of the readout light P1 may be previously determined based on theoretical values, and the calculation unit 32 may store the measurement results or computation results. In that case, the measurement section 40 and the measurement step S11 can be omitted.

Figure 5:
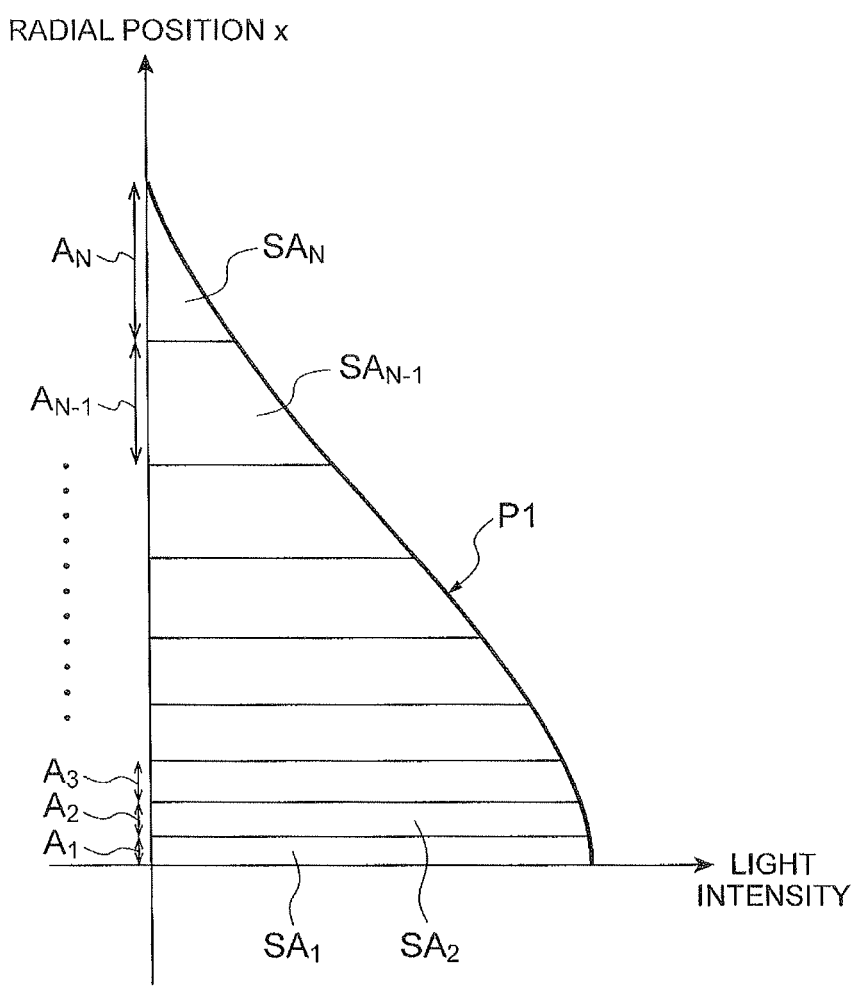
FIG. 5 is a graph showing a state of division of a region on a phase modulation plane.

Next, a region on the phase modulation plane 20a that the readout light P1 enters is divided into, a plurality of regions (first division step S12). FIG. 5 is a graph showing a state of the division, in which the vertical axis shows the position (the optical axis of the readout light P1 is the origin) on the phase modulation plane 20a, and the horizontal axis shows light intensity. As shown in FIG. 5, in this step S12, the region on the phase modulation plane 20a is divided into N (N is an integer of 2 or more) concentric regions $A_1 \ldots A_N$ centered on the optical axis of the readout light P1. At this time, the sizes of the regions $A_1 \ldots A_N$ are set such that integration values $SA_1 \ldots SA_N$ of the intensity distribution in the regions $A_1 \ldots A_N$ in the section including the optical axis of the readout light P1 are equal to each other (i.e., $SA_1=SA_2=\ldots=SA_N$). When, for example, the intensity distribution of the readout light P1 is a Gaussian distribution as shown in FIG. 5, the intensity in the vicinity of the optical axis is high and the intensity gradually reduces as it becomes distant from the optical axis. Thus, if the regions $A_1 \ldots A_N$ are set such that the integration values $SA_1 \ldots SA_N$ are equal to each other, the radial width of each of the regions $A_1 \ldots A_N$ is the narrowest in the region $A_1$ that is closest to the optical axis, and is the widest in the region $A_N$ that is farthest from the optical axis. That is, the widths of the regions $A_1 \ldots A_N$ follow a density distribution function of a Gaussian distribution.

A specific calculation method in the first division step S12 is as follows. First, an integration value SA of an intensity distribution $G_1(x)$ (here, x is a radial position coordinate) of the readout light P1 is determined, and the integration value SA is equally divided by a division number N to calculate $\Delta SA = SA/N$. Next, the distance from a neighboring light ray position $x_{n-1}$ is provided as $\delta x_n$, and the following minute integration value $\delta SA(n)$ is determined from a light intensity $G_1(x_{n-1}+\delta x_n)$ at that coordinate.

$$\delta SA(n)=G_1(x_{n-1}+\delta x_n)\times \delta x_n \quad (1)$$

A minute variable $\delta x_n$ when the minute integration value $\delta SA(n)$ becomes equivalent to the equally divided integration value SA/N described above, that is, $\delta SA(n)=\Delta SA$ is attained corresponds to the width of the region $A_n$. By repeating such calculation, the widths of the respective radial regions $A_1 \ldots A_N$ of the readout light P1 can be determined.

Further, in this phase distribution calculation step S1, a region on the target plane TA that the modulated light P2 enters is divided into a plurality of regions (second division step S13), In addition, the second division step S13 may be performed prior to the first division step S12, or may be performed simultaneously with the first division step S12.

Figure 6:
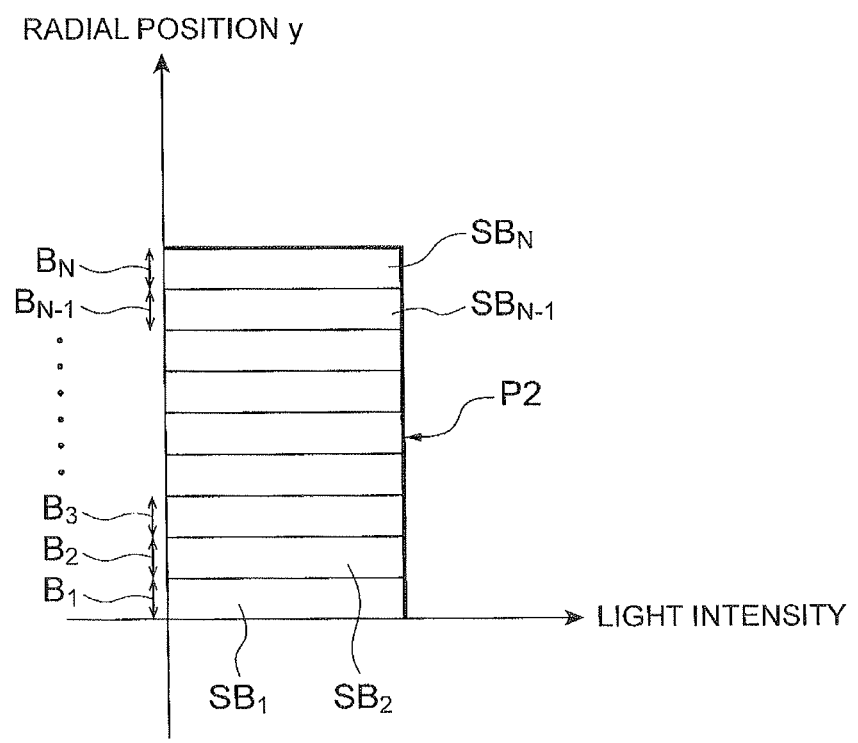
FIG. 6 is a graph showing a state of division of a region on a target plane.

FIG. 6 is a graph showing a state of the division, in which the vertical axis shows the position (the optical axis of the modulated light P2 is the origin) on the target plane TA, and the horizontal axis shows light intensity. As shown in FIG. 6, in this step S13, the region on the target plane TA is divided into N (i.e., the same in number as the regions $A_1 \ldots A_N$) concentric regions $B_1 \ldots B_N$ centered on the optical axis of the modulated light P2. At this time, the sizes of the regions $B_1 \ldots B_N$ are set such that integration values $SB_1 \ldots SB_N$ of the intensity distribution in the regions $B_1 \ldots B_N$ in the section including the optical axis of the modulated light P2 are equal to each other (i.e., $SB_1=SB_2=\ldots=SB_N$). When, for example, the intensity distribution of the modulated light P2 is in a uniform top hat shape as shown in FIG. 6, the intensity is constant regardless of the distance from the optical axis. Thus, if the regions $B_1 \ldots B_N$ are set such that the integration values $F_1 \ldots F_N$ are equal to each other, the radial width of each of the regions $B_1 \ldots B_N$ is a constant width regardless of the distance from the optical axis.

A specific calculation method in the second division step S13 is as follows. First, an integration value SB of a predetermined intensity distribution $G_2(y)$ (here, y is a radial position coordinate) of the modulated light P2 is determined, and the integration value SB is equally divided by a division number N to calculate $\Delta SB=SB/N$. Next, the distance from a neighboring light ray position $y_{n-1}$ is provided as $\delta y_n$, and the following minute integration value $\delta SB(n)$ is determined from a light intensity $G_2(y_{n-1}+\delta y_n)$ at that coordinate.

$$\delta SB(n)=G_2(y_{n-1}+\delta y_n)\times \delta y_n \quad (2)$$

A minute variable $\delta y_n$ when the minute integration value $\delta SB(n)$ becomes equivalent to the equally divided integration value SB/N described above, that is, $\delta SB(n)=\Delta SB$ is attained corresponds to the width of the region $B_n$. By repeating such calculation, the widths of the respective radial regions $B_1 \ldots B_N$ of the modulated light P2 can be determined.

Figure 7:
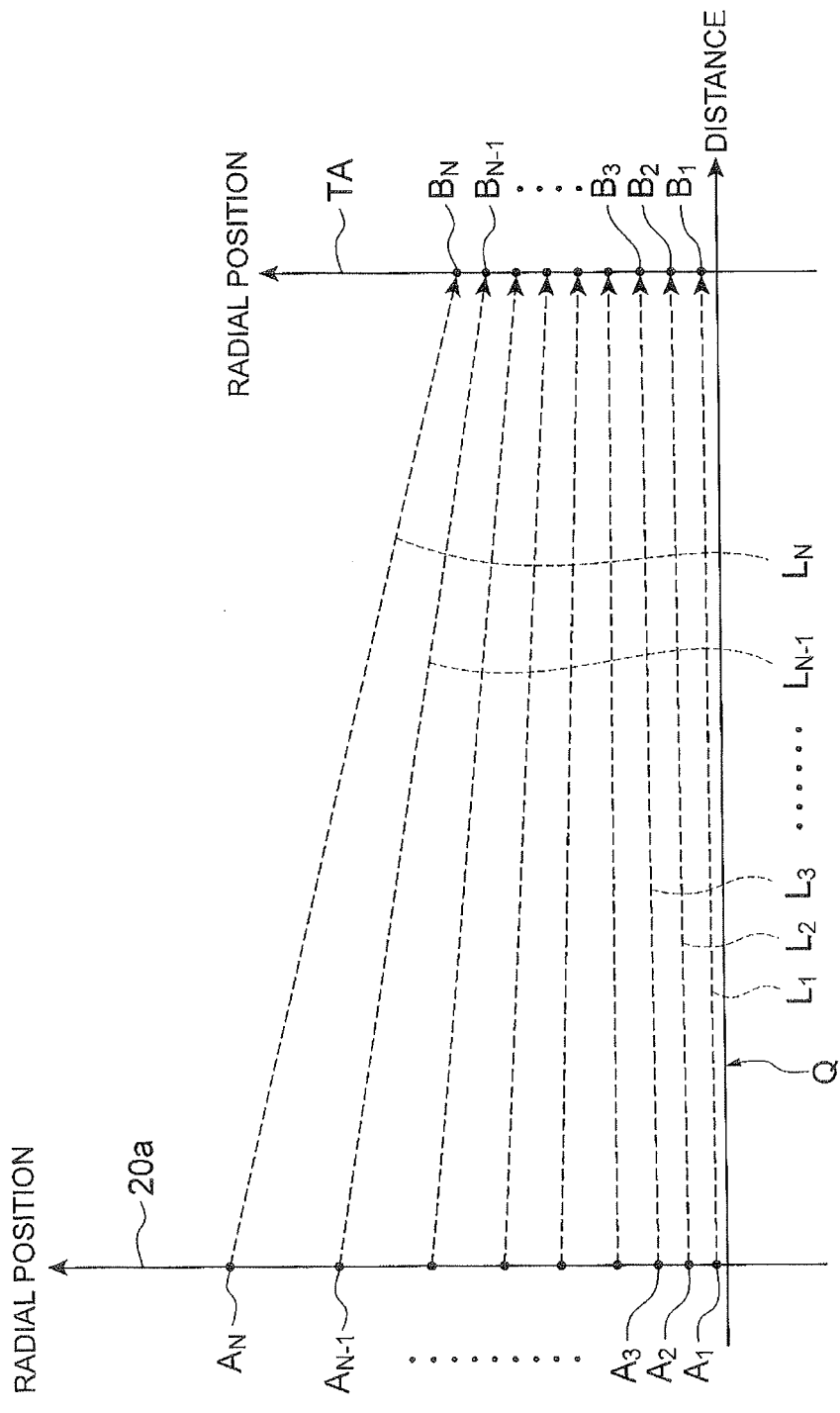
FIG. 7 is a diagram conceptually showing calculation in an optical path length calculation step.

Subsequently, an optical path length $L_n$ from the region $A_n$ to the region $B_n$ (n is each integer from 1 to N) is determined (optical path length calculation step S14). Here, FIG. 7 is a diagram conceptually showing calculation in this optical path length calculation step S14. In addition, reference symbol Q in FIG. 7 shows the optical axis of the modulated light P2. As shown in the figure, in this optical path length calculation step S14, an optical path length $L_1$ from the region $A_1$ to the region $B_1$, an optical path length $L_2$ from the region $A_2$ to the region $B_2$, ..., and an optical path length $L_N$ from the region $A_N$ to the region $B_N$ are calculated. Then, the phase of the region $A_n$ is determined based on the optical path length $L_n$. For example, by converting an optical path difference $L_{n1}-L_{n2}$ (n1 and n2 are integers of 1 or more and N or less, n1≠n2) between an optical path length $L_{n1}$ and another optical path length $L_{n2}$ into a phase difference, the phase of each region $A_n$ can be determined. Or, by converting a difference $L_n-L_0$ between an optical path length $L_n$ and an optical axis length $L_0$ of the modulated light P2 into a phase difference, the phase of each region $A_n$ can be determined. By thus determining the phases for all regions $A_1 \ldots A_N$, a phase distribution is calculated (phase distribution calculation step S15). In addition, because the thus determined phase distribution is a one-dimensional distribution along the radial direction of the readout light P1, by making this distribution move around the optical axis Q of the modulated light P2 as the center, a two-dimensional phase distribution can be determined. Further, a propagation function that is used when determining respective phase differences of the regions $A_1 \ldots A_N$ is not limited to a geometric-optical one, but may be based on Fresnel propagation rules or a Helmholtz equation.

<Generation of Modulated Light>.

In the modulated light generation step S2, a control signal indicating a phase distribution calculated by the phase distribution calculation step S1 is provided to the spatial light modulator 20 from the control section 30. The spatial light modulator 20 displays this phase distribution on the phase modulation plane 20a, and modulates readout light P1 having entered the phase modulation plane 20a to generate modulated light P2. The modulated light P2 reaches the target plane TA with a predetermined intensity distribution.

Effects of the phase modulation device 1A and the phase modulation method of the present embodiment described above will be described. In the present embodiment, by modulating the phase of the readout light P1 using the spatial light modulator 20, the intensity distribution of the modulated light P2 is controlled so as to approximate a predetermined distribution. Thus, as compared with a method of controlling the intensity distribution using a fixed lens as conventionally performed, even when, for example, the readout light P1 changes in beam diameter, light having an arbitrary sectional shape can be generated simply and easily by changing the phase distribution. Further, a change in the position of the target plane TA, a change in intensity distribution shape, and the like can be easily responded to.

Further, in the phase modulation device 1A and the phase modulation method of the present embodiment, a phase distribution for realizing a desired intensity distribution in, for example, a top hat shape can be determined with high accuracy by the simple calculation as shown in the flowchart of FIG. 4. In general, laser light that is used as readout light P1 often has an intensity distribution that, like for example a Gaussian distribution, it is strongest in the vicinity of the optical axis and gradually weakens as it separates from the optical axis. However, in laser processing and the like, a so-called top hat beam (or homogenized beam) having, not such a smooth intensity distribution, but such an intensity distribution that the intensity within a predetermined region is uniform and the intensity is zero outside the region is demanded in some cases. If the top hat beam is focused by an objective lens or the like, a smaller beam spot (light condensing point) can be obtained than with a beam having a smooth intensity distribution, so that processing accuracy can be increased, and further microscopic processing is enabled.

A top hat beam can also be generated by, for example, expanding a beam in diameter using a spatial filter and extracting only its central portion. However, such a generation method involves a large loss in the light amount and is therefore not suitable for use in laser processing that requires a considerably high light intensity. In contrast thereto, the phase modulation device 1A and the phase modulation method of the present embodiment can use the readout light P1 almost entirely in the light amount to generate top hat shaped modulated light P2 and are therefore suitable for use in laser processing that requires a considerably high light intensity.

Figure 8:
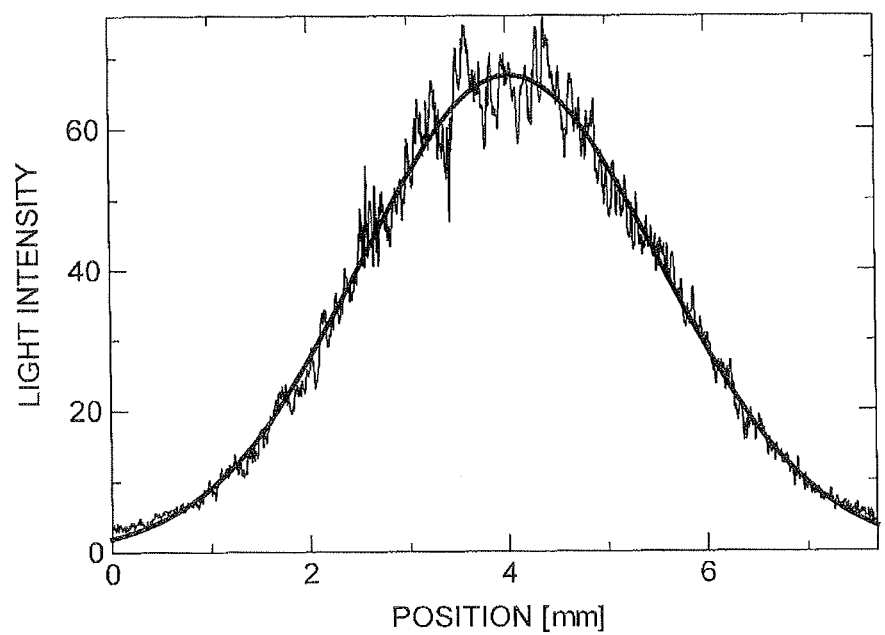
FIG. 8 is a graph showing an intensity distribution of readout light derived in an example.
Figure 9:
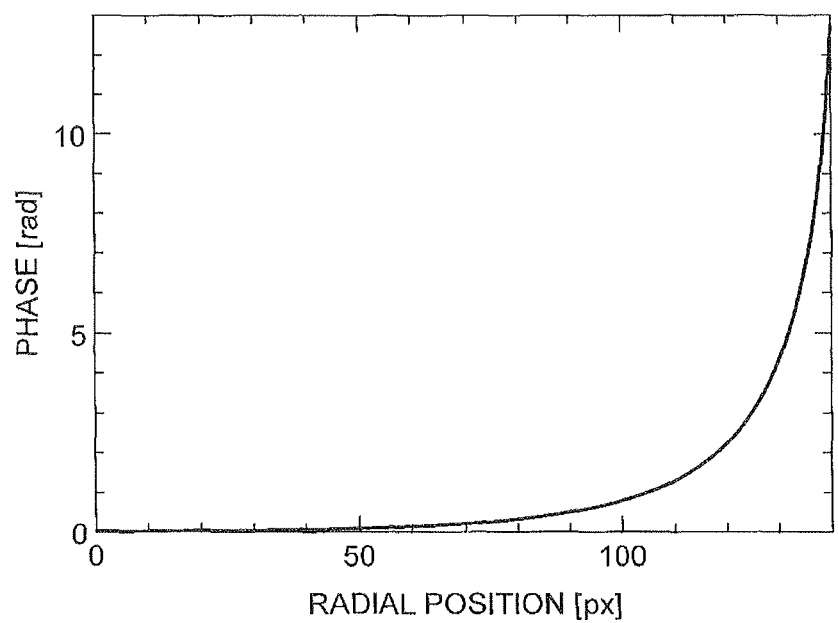
FIG. 9 is a graph showing a phase distribution calculated in an example.
Figure 10:
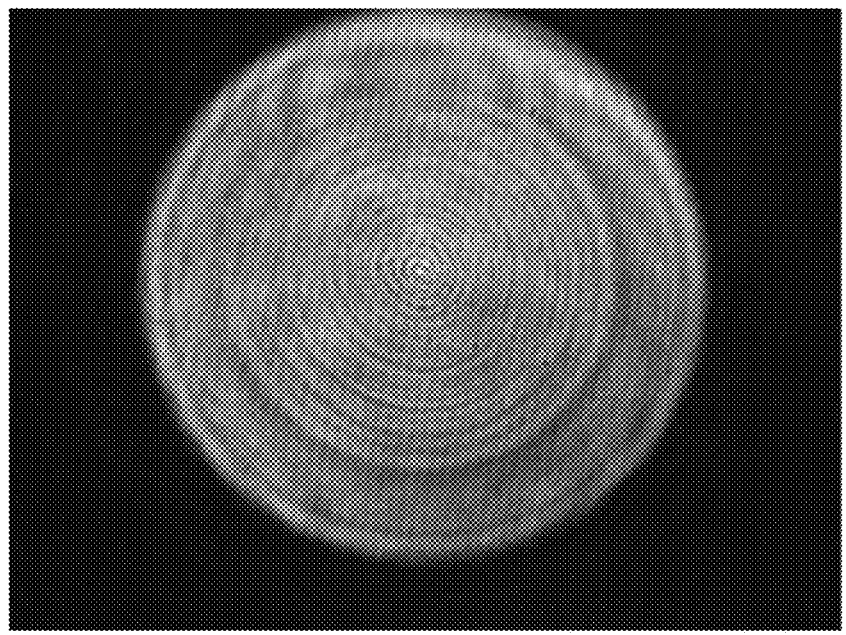
FIG. 10 is an image of modulated light having a top hat shaped intensity distribution, imaged in an optical axis direction.

An example in which modulated light P2 having a top hat shaped intensity distribution was generated will be described as a practical example. In this example, an intensity distribution of readout light P1 was measured by a CMOS camera, and an intensity distribution is derived from that image. FIG. 8 is a graph showing the intensity distribution of readout light P1 derived in the present example. Here, as a beam radius r1 of the readout light P1, a radius value r1=140 [px] (=2.8 [mm]) where the light intensity takes $1/e^2$ of the maximum value was used, and the intensity distribution of the readout light P1 was approximated to a truncated Gaussian distribution. Further, a beam radius r2 of an intensity distribution of the modulated light P2 on the target plane TA was provided as 1.2 mm, an optical distance d between the phase modulation plane 20a and the target plane TA was provided as 150 mm, and the wavelength λ of the readout light P1 and the modulated light P2 was provided as 633 nm. FIG. 9 is a graph showing the thus calculated phase distribution. In addition, in FIG. 9, the vertical axis shows phase (unit: rad), and the horizontal axis shows the radial position of the readout light P1 in the phase modulation plane 20a in pixel units. By calculating a two-dimensional phase distribution based on the one-dimensional phase distribution shown in FIG. 9 and further wrapping the phase at $2\pi$ radians, a desired phase distribution (homogenized pattern) for realizing a top hat shaped intensity distribution is completed. FIG. 10 is an image of the modulated light P2 having a top hat shaped intensity distribution, obtained in the present example, imaged in an optical axis direction.

Figure 11:
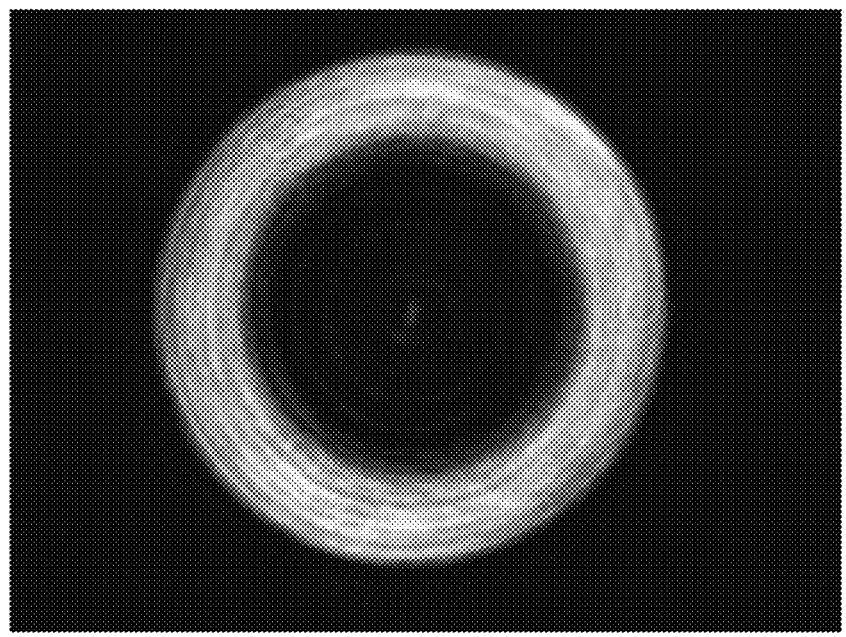
FIG. 11 is an image of modulated light having an annular zone shaped intensity distribution, imaged in an optical axis direction.

Further, in the phase modulation device 1A and the phase modulation method of the present embodiment, an intensity distribution in, for example, an annular zone shape where the light amount in a central portion is close to zero can also be realized by the simple calculation as shown in the flowchart of FIG. 4. FIG. 11 is an image of the modulated light P2 having an annular zone shaped intensity distribution, obtained in the same manner as in the above-described example, imaged in an optical axis direction. For generating such annular zone shaped modulated light P2, it suffices to change a predetermined intensity distribution on the target plane TA in the present embodiment. That is, it suffices to divide the region that constitutes an annular zone into N equal regions $B_1 \ldots B_N$ and perform the calculation described above. In addition, when changing the annular zone in width, it suffices to change the width of the above-described region that constitutes an annular zone. As described above, according to the present embodiment, a change in the shape of the modulated light P2 can thus be considerably easily performed.

In the phase modulation device 1A and the phase modulation method of the present embodiment, after calculating a one-dimensional phase distribution in the calculation unit 32, a phase distribution function regarding the radial position of the readout light P1 may be prepared using a fitting technique such as a least square method. Then, a two-dimensional phase distribution may be prepared based on the phase distribution function.

Further, in the phase modulation device 1A and the phase modulation method of the present embodiment, when calculating respective phase differences of the regions $A_1 \ldots A_N$, the following values may be included as initial values in the calculation. In addition, in the case of inclusion in calculation as initial values, it is necessary for these values that a distribution in an arbitrary section including an optical axis is axially symmetric with respect to the optical axis. Further, these values may be values in either of the phase modulation plane 20a and the target plane TA, or may be values in both thereof.

A previously measured or estimated value of a wavefront of readout light P1 that enters the phase modulation plane 20a A measured or estimated value of plane distortion of the phase modulation plane 20a A measured or estimated value of wavefront aberration generated in an optical system that propagates readout light P1 and/or modulated light P2

A wavefront shape expressed by an orthogonal function system such as a Zernike polynomial A Fresnel lens pattern having an arbitrary focal length A Fourier type hologram or Fresnel type hologram (here, at this time, the Fourier type hologram may be one where the position of the target plane TA of FIG. 1 is taken into consideration.)

In addition, these values may be added after calculating respective phase differences of the regions $A_1 \ldots A_N$ or after preparing a phase distribution. In addition, in the case of addition to the calculated respective phase differences or the phase distribution, it is not necessary for these values that a distribution in an arbitrary section including an optical axis is axially symmetric with respect to the optical axis. Further, a part of these values may be included as an initial value in calculation of a phase difference, and the other part may be added to the calculated phase difference or the phase distribution.

Further, in the present embodiment, the region of the phase modulation plane 20a or the target plane TA is divided into the regions $A_1 \ldots A_N$ or the regions $B_1 \ldots B_N$ based on a one-dimensional intensity distribution, but the region of the phase modulation plane 20a or the target plane TA may be divided by a minute area element dS based on a two-dimensional intensity distribution. In this case, the above-described formulas (1) and (2) become as follows.

$$\delta SA(n)=G_1(x_{n-1}+\delta x_n)\times \delta x_n \times (x_n \times \delta\theta) \tag{3}$$

$$\delta SB(n)=G_2(y_{n-1}+\delta y_n)\times \delta y_n \times (y_n \times \delta\theta) \tag{4}$$

Here, δθ is a minute rotation angle.

Further, in the present embodiment, a phase distribution that is to be displayed on the phase modulation plane 20a is calculated based on respective intensity distributions of the readout light P1 and the modulated light P2. Thus, optimization has not been performed for an input phase of the readout light P1 and an output phase of the modulated light P2. These may be converged for optimization to desired phase values by using, for example, a numerical calculation such as an iteration method.

Here, whether the phase distribution displayed on the phase modulation plane 20a is one calculated by the calculation method of the present embodiment is verified by the following method. That is, when it is possible to extract the phase distribution displayed on the phase modulation plane 20a from the phase modulation device 1A, verification is possible by calculating a difference from a phase distribution calculated by the calculation method of the present embodiment so as to make a comparison.

Further, a correlation coefficient of the phase distribution extracted from the phase modulation device 1A and the phase distribution calculated by the calculation method of the present embodiment may be calculated. In addition, a correlation coefficient R of a data array $(x_i, y_i)$ (here, $i=1, \ldots, N$) including N sets of paired numerical values that are targets for comparison is provided by the following formula (5).

[Formula 1]

$$R = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (5)$$

Further, a wavefront of the modulated light P2 may be measured, and a phase distribution displayed on the phase modulation plane 20a may be estimated based on the measurement result. Specifically, any of the following methods can be used.

Measuring a wavefront of the modulated light P2 using an optical interferometric measurement technique.

Measuring a spatial distribution of the phase of the modulated light P2 using a Shack-Hartmann type wavefront sensor or the like.

Measuring an intensity distribution of the modulated light P2 on the target plane TA and an intensity distribution of the modulated light P2 on one or more planes located in at least one of the front stage side and rear stage side of the target plane TA using a two-dimensional sensor (for example, a camera) or the like. Then, phase information is estimated using a Fresnel propagation calculation or the like where the distance from the phase modulation plane 20a or the target plane TA is taken into consideration.

In the present embodiment, the irradiation object may be placed on a stage. The stage is preferably capable of moving by at least one axis, and more preferably, is movable in any, at least one direction of an x-axis and a y-axis that intersect the optical axis of the modulated light P2 and are perpendicular to each other, a z-axis along the optical axis of the modulated light P2, around the x-axis, around the y-axis, and around the z-axis. The stage may be driven either manually or electrically.

Further, when the phase modulation device 1A of the present embodiment is used for a microscope, the phase modulation device 1A may further include an observation optical system for observing an irradiation object (observation object). In this case, the observation optical system may receive light reflected on the irradiation object, or may receive light transmitted through the irradiation object.

(First Modification)

Figure 12:
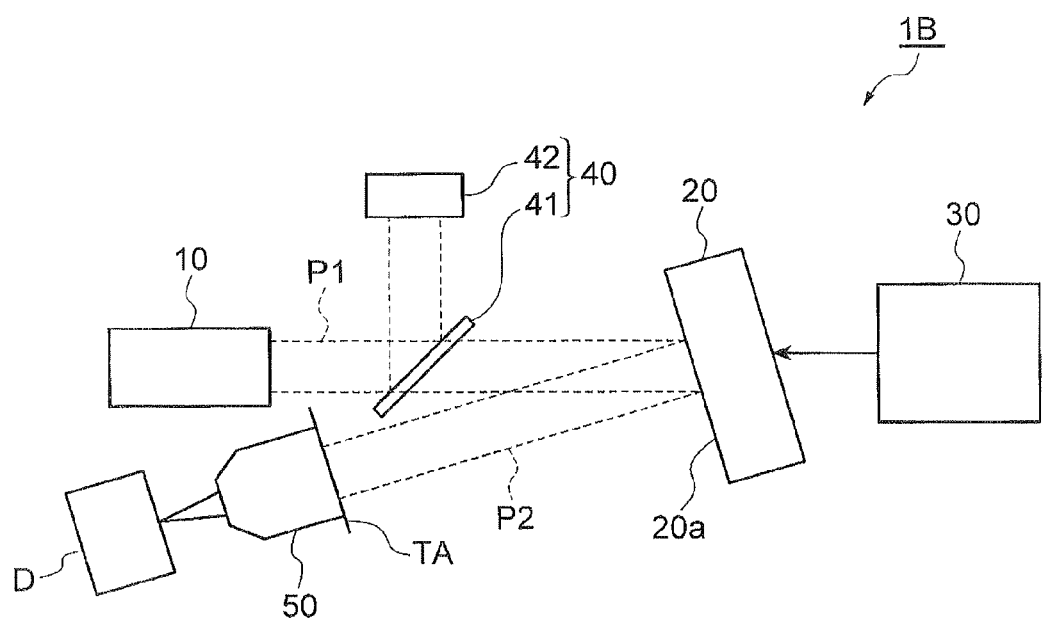
FIG. 12 is a view showing a configuration of a phase modulation apparatus serving as a first modification.

FIG. 12 is a view showing a configuration of a phase modulation device 1B as a first modification of the above-described embodiment. The phase modulation device 1B further includes an objective lens 50, in addition to the configuration of the phase modulation device 1A described above. The objective lens 50 is disposed, between the phase modulation plane 20a and an irradiation object D, such that its pupil coincides with the target plane TA. When, for example, annular zone shaped modulated light P2 as shown in FIG. 11 enters the objective lens 50, it illuminates a region along the edge of the objective lens 50. Thus, a dark-field illumination microscope, a phase contrast microscope, a total reflection microscope, a light irradiation device that forms a minute spot, or the like is favorably realized.

(Second Modification)

In the above-described embodiment, a phase distribution that is, where the distance from the phase modulation plane 20a to the target plane TA is provided as d, represented as a curved surface with a radius of curvature of ±d or a paraboloidal surface with a focus of ±d may be previously calculated, and this phase distribution may be used as an initial value when calculating a phase distribution in the calculation unit 32. An infinite diffraction phase pattern can thereby be generated. Or, an infinite diffraction phase pattern may be generated by previously calculating a phase distribution that is represented as a curved surface with a radius of curvature of ±d or a paraboloidal surface with a focus of ±d and adding this phase distribution to a phase distribution calculated in the calculation unit 32. In addition, it is preferable that whether the radius of curvature is positive or negative is determined by a ratio of a beam radius r1 of the readout light P1 on the phase modulation plane 20a and a beam radius r2 of the modulated light P2 on the target plane TA.

Further, the phase modulation device of the present modification may further include at least one of a front optical system that propagates readout light P1 to the phase modulation plane 20a and a rear optical system that propagates modulated light P2 output from the phase modulation plane 20a to an irradiation object. A phase distribution that is generated in the present modification is a Fourier diffraction type, which therefore means that the target plane TA exists at infinite distance, but by for example a condenser lens being disposed as a rear optical system, a predetermined intensity distribution can be obtained at a focal plane of the condenser lens. Thus, disposing an irradiation object at a position separated by a focal length from the condenser lens allows irradiating the irradiation object with the modulated light P2 having a predetermined intensity distribution. Further, by changing the focal length of the condenser lens, it is also possible to change the beam diameter of the modulated light P2 on the target plane TA.

As the above-described front optical system, a beam expander, a spatial filter, or the like is preferred. Further, as the rear optical system, a 4f telecentric optical system or an imaging optical system such as a zoom lens is preferred. In addition, in the rear optical system, the imaging magnification may be variable. In that case, an unnecessary light component is condensed to a central portion depending on the imaging magnification, a zeroth-order light cut filter to shield that light component may be further installed.

(Second Embodiment)

Subsequently, a phase modulation device and a phase modulation method according to a second embodiment of the present invention will be described. Similar to the phase modulation device 1A of the first embodiment, the phase modulation device of the present embodiment includes a light source 10, a spatial light modulator 20, a control section 30, and a measurement section 40. However, readout light P1 that the light source 10 of the present embodiment outputs needs not to have an intensity distribution that is axially symmetric with respect to an optical axis in an arbitrary section including the optical axis, and can have various intensity distributions. Further, calculation of a phase distribution to be described in the following may be performed by the calculation unit 32 of the control section 30, or may be previously performed in the outside of the phase modulation device, and the calculated phase distribution may be stored in the storage unit 31.

Figure 13:
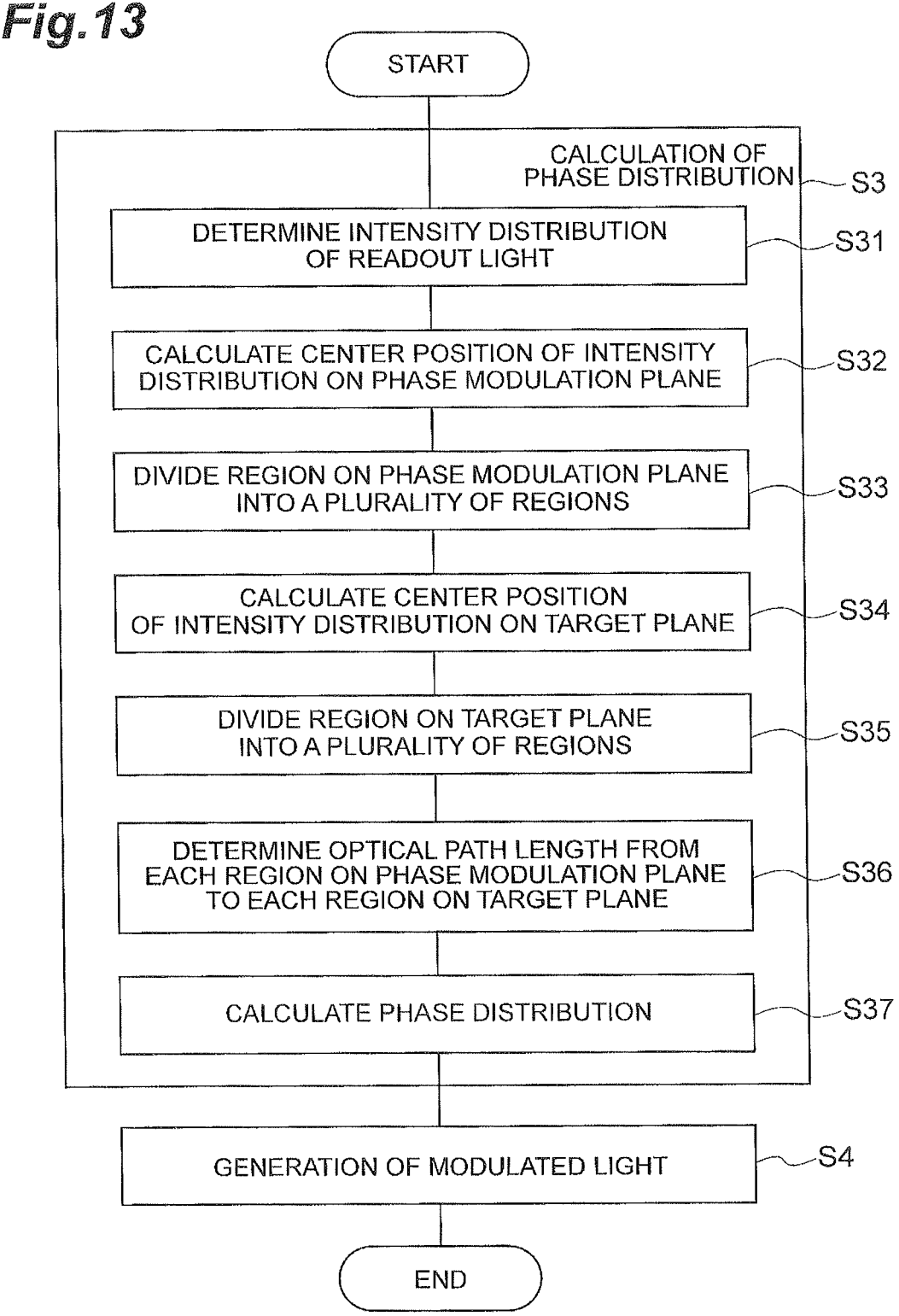
FIG. 13 is a flowchart showing a phase modulation method according to a second embodiment.

FIG. 13 is a flowchart showing the phase modulation method according to the present embodiment. As shown in FIG. 13, the phase modulation method of the present embodiment includes a phase distribution calculation step S3 and a modulated light generation step S4.

<Calculation of Phase Distribution>

In the phase distribution calculation step S3, a phase distribution to be displayed on the phase modulation plane 20a is calculated such that the modulated light P2 has a predetermined intensity distribution on the target plane TA. The phase distribution that is calculated in the present embodiment is for converting readout light P1 to modulated light P2. In the present embodiment, a phase distribution is calculated based on a two-dimensional intensity distribution of the readout light P1 and the modulated light P2 in a polar coordinate system.

In the phase distribution calculation step S3, first, an intensity distribution of the readout light P1 that enters the phase modulation plane 20a is determined (measurement step S31). The intensity distribution of the readout light P1 is determined by the measurement section 40. In addition, similar to the first embodiment, the intensity distribution of the readout light P1 may be previously measured or the intensity distribution of the readout light P1 may be previously determined based on theoretical values, and the calculation unit 32 may store the measurement results or computation results. In that case, the measurement section 40 and the measurement step S31 can be omitted.

Figure 14:
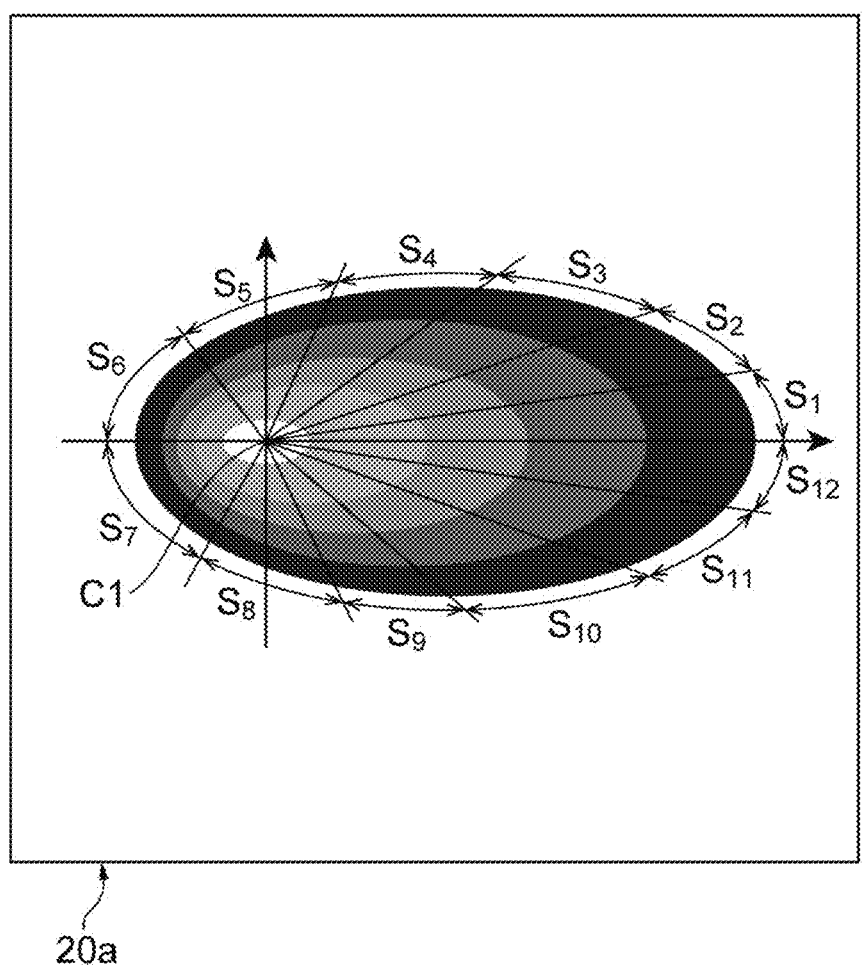
FIG. 14 is a plan view showing a state of division of a region on a phase modulation plane.

Next, a centroid position of the intensity distribution of the readout light P1 is calculated based on the intensity distribution measured in the measurement step S31 (first centroid computation step S32). Then, a region on the phase modulation plane 20a that the readout light P1 enters is divided into a plurality of regions (first division step S33). FIG. 14 is a plan view showing a state of the division. In addition, in FIG. 14, the intensity distribution of the readout light P1 is shown by color shading, in which the part in white has the largest light intensity, the part in black has the smallest light intensity, and the darker in color, the smaller in light intensity. As shown in FIG. 14, in this step S33, the region on the phase modulation plane 20a that the readout light P1 enters is divided, in a polar coordinate system that takes as the center of the coordinates the centroid position C1 calculated in the centroid computation step S32, into M (M is an integer of 2 or more) fan-shaped regions $S_1 \ldots S_M$ in an angular direction. At this time, the sizes of the regions $S_1 \ldots S_M$ are set such that integration values of the intensity distribution in the respective regions $S_1 \ldots S_M$ are equal to each other. In addition, in FIG. 14, readout light P1 having an ellipsoidal sectional shape is shown as an example, and the centroid of its light intensity distribution is shifted to one side in a major axis direction. Moreover, in the figure, an example of dividing an input region of the readout light P1 into 12 regions $S_1 \ldots S_{12}$ is shown.

Further, in this phase distribution calculation step S3, a centroid position of the intensity distribution of the modulated light P2 on the target plane TA is calculated (second centroid computation step S34). Then, a region on the target plane TA that the modulated light P2 enters is divided into a plurality of regions (second division step S35). In addition, the second division step S35 may be performed prior to the first division step S33, or may be performed simultaneously with the first division step S33.

Figure 15:
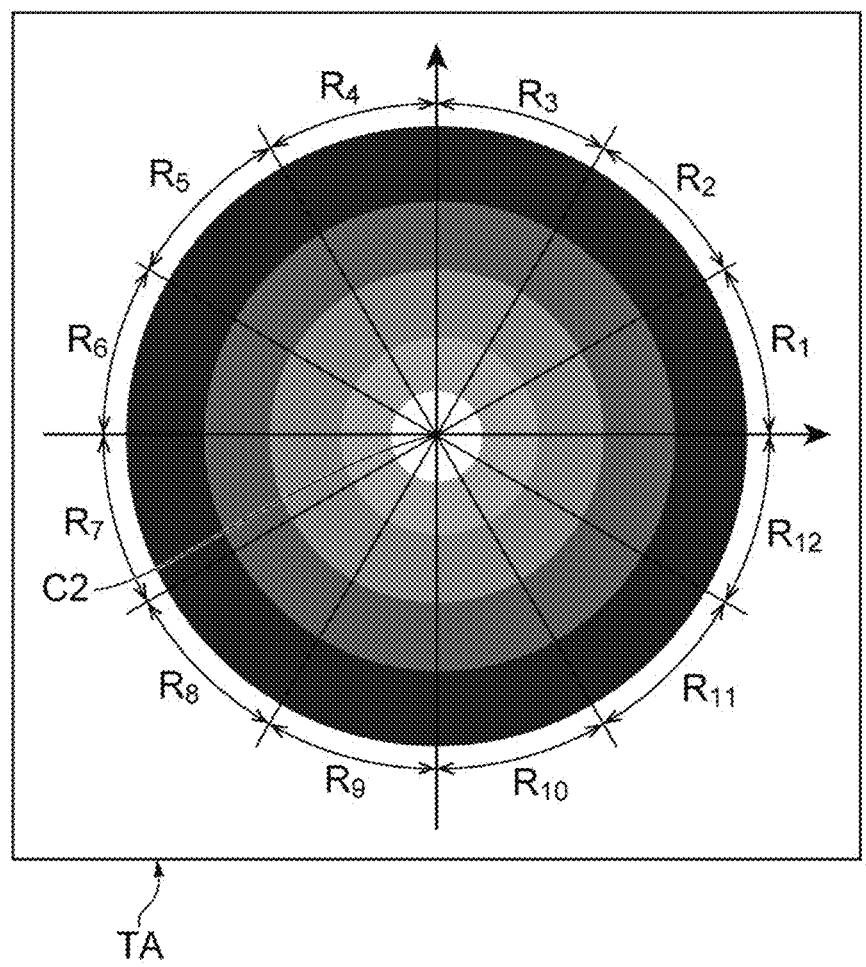
FIG. 15 is a plan view showing a state of division of a region on a target plane.

FIG. 15 is a plan view showing a state of the division. In addition, also in FIG. 15, the intensity distribution of the modulated light P2 is shown by color shading, in which the part in white has the largest light intensity, the part in black has the smallest light intensity, and the darker in color, the smaller in light intensity. As shown in FIG. 15, in this step S35, the region on the target plane TA that the modulated light P2 enters is divided, in a polar coordinate system that takes as the center of the coordinates the centroid position C2 calculated in the centroid computation step S34, into M fan-shaped regions $R_1 \ldots R_M$ in an angular direction. At this time, the sizes of the regions $R_1 \ldots R_M$ are set such that integration values of the intensity distribution in the respective regions $R_1 \ldots R_M$ are equal to each other. In addition, in FIG. 15, modulated light P2 having a circular sectional shape is shown as an example, and the centroid of its light intensity distribution coincides with the center of the circle. Moreover, in the figure, an example of dividing an input region of the modulated light P2 into 12 regions $R_1 \ldots R_{12}$ is shown.

Subsequently, an optical path length $LB_m$ from the region $S_m$ to the region $R_m$ (m is each integer from 1 to M) is determined (optical path length calculation step S36). In this optical path length calculation step S36, an optical path length $LB_1$ from the region $S_1$ to the region $R_1$, an optical path length $LB_2$ from the region $S_2$ to the region $R_2, \ldots$, and an optical path length $LB_M$ from the region $S_M$ to the region $R_M$ are calculated. Then, the phase of the region $S_m$ is determined based on the optical path length $LB_m$. For example, by converting an optical path difference $LB_{m1}-LB_{m2}$ (m1 and m2 are integers of 1 or more and M or less, m1≠m2) between an optical path length $LB_{m1}$ and another optical path length $LB_{m2}$ into a phase difference, the phase of each region $S_m$ can be determined. Or, by converting a difference $LB_m-LB_0$ between an optical path length $LB_m$ and an optical axis length $LB_0$ of the modulated light P2 into a phase difference, the phase of each region $S_m$ can be determined. By thus determining the phases for all regions $S_1 \ldots S_M$, a phase distribution is calculated (phase distribution calculation step S37). In addition, a propagation function that is used when determining respective phase differences of the regions $S_1 \ldots S_M$ is not limited to a geometric-optical one, but may be based on Fresnel propagation rules or a Helmholtz equation.

<Generation of Modulated Light>

In the modulated light generation step S4, a control signal indicating a phase distribution calculated by the phase distribution calculation step S3 is provided to the spatial light modulator 20 from the control section 30. The spatial light modulator 20 displays this phase distribution on the phase modulation plane 20a, and modulates readout light P1 having entered the phase modulation plane 20a to generate modulated light P2. The modulated light P2 reaches the target plane TA with a predetermined intensity distribution.

According to the phase modulation device and the phase modulation method of the present embodiment described above, similar to the first embodiment, even when, for example, the readout light P1 changes in beam diameter, light having an arbitrary sectional shape can be generated simply and easily by changing the phase distribution. Further, a change in the position of the target plane TA, a change in intensity distribution shape, and the like can be easily responded to. Further, a phase distribution for realizing a desired intensity distribution can be determined with high accuracy. In addition, in the present embodiment, an example of dividing each of the region on the phase modulation plane 20a that the readout light P1 enters and the region on the target plane TA that the modulated light P2 enters in the angular direction of a polar coordinate system that takes the centroid at an origin has been described, but the configuration of division is not limited thereto. These regions can be divided with various other configurations in which the division number of the region on the phase modulation plane 20a and the division number of the region on the target plane TA are the same in number.

Although preferred embodiments of a phase modulation method and a phase modulation device according to the present invention have been described above, the present invention is not limited to the above-described embodiments, and can be variously modified within the scope of the present invention. For example, a phase distribution calculated in the phase distribution calculation step may be superimposed with a hologram for realizing another function so as to realize functions of these simultaneously. As an example, superimposing a calculated phase distribution with a Fourier type hologram by a complex amplitude method allows simultaneously realizing two functions. Or, by limiting a calculation target region in the phase modulation plane when calculating a phase distribution and embedding information such as a Fourier type hologram in a region other than the calculation target region, two functions can be simultaneously realized. Further, because a spatial light modulator is used in the above-described embodiments, the function can be easily switched by changing a hologram to be displayed on the phase modulation plane. As an example, two different functions may be realized in one phase modulation device by mutually switching a phase distribution (hologram) that is calculated in the phase distribution calculation step and a Fourier type hologram.

Further, the phase modulation methods and the phase modulation devices of the above-described respective embodiments may further include a feedback system that measures an intensity distribution or phase distribution of modulated light or both of the intensity distribution and phase distribution, and reflects the measurement result in a phase distribution calculation in the phase distribution calculation step. Or, the phase modulation methods and the phase modulation devices of the above-described respective embodiments may further include a feedback system that measures an intensity distribution or phase distribution of modulated light or both of the intensity distribution and phase distribution, and selects an appropriate phase distribution from among a plurality of previously calculated phase distributions based on the measurement result. Further, the phase modulation methods and the phase modulation devices of the above-described respective embodiments may perform a phase distribution calculation in the phase distribution calculation step based on control from an external signal.

Further, in the above-described first embodiment, a phase distribution is calculated based on a one-dimensional intensity distribution both on the phase modulation plane and on the target plane, and in the above-described second embodiment, a phase distribution is calculated based on a two-dimensional intensity distribution both on the phase modulation plane and on the target plane. In the present invention, for example, a phase distribution may be calculated based on a one-dimensional intensity distribution on either one of the phase modulation plane and the target plane, and a phase distribution may be calculated based on a two-dimensional intensity distribution on the other thereof.

INDUSTRIAL APPLICABILITY

The present invention is applicable as a phase modulation method and a phase modulation apparatus capable of simply determining a phase distribution for realizing a desired intensity distribution with high accuracy.

REFERENCE SIGNS LIST 1A, 1B—phase modulation device, 10—light source, 20—spatial light modulator, 20a—phase modulation plane, 30—control section, 31—storage unit, 32—calculation unit, 33—selection unit, 34—drive unit, 35—external input unit, 40—measurement section, 41—beam splitter, 42—optical sensor, 50—objective lens, P1—readout light, P2—modulated light, TA—target plane.

The invention claimed is:

1. A phase modulation method, using a spatial light modulator comprising a phase modulation plane including a plurality of two-dimensionally arrayed modulation regions, for modulating readout light, of which a readout light intensity distribution in a first section including a first optical axis of the readout light is axially symmetric with respect to the first optical axis, in phase in each of the plurality of modulation regions to generate modulated light, comprising:
  a phase distribution calculation step of calculating a phase distribution to be displayed on the phase modulation plane such that the modulated light has a predetermined intensity distribution on a target plane separated by a predetermined optical distance from the phase modulation plane; and
  a modulated light generation step of displaying the phase distribution on the phase modulation plane, and causing the readout light to enter the phase modulation plane so as to generate the modulated light, wherein
  the phase distribution calculation step comprises:
  a step of dividing a light entering region on the phase modulation plane which the readout light enters into N (N is an integer of 2 or more) concentric first regions $A_1 \ldots A_N$ centered on the first optical axis of the readout light and
  setting sizes of the first regions $A_1 \ldots A_N$ such that first integration values of the readout light intensity distribution in the first section including the first optical axis of the readout light, the first integration values being obtained by integrating the readout light intensity distribution in the respective first regions $A_1 \ldots A_N$, are equal to each other, and
  dividing a target region on the target plane into N concentric second regions $B_1 \ldots B_N$ centered on a second optical axis of the modulated light and setting sizes of the second regions $B_1 \ldots B_N$ such that second integration values of a modulated light intensity distribution in a second section including the second optical axis of the modulated light, the second integration values being obtained by integrating the modulated light intensity distribution in the respective second regions $B_1 \ldots B_N$, are equal to each other; and a step of calculating the phase distribution by obtaining an optical path length $L_n$ from the first region $A_n$ to the second region $B_n$ (n is each integer from 1 to N), and determining a phase of the first region $A_n$ based on the optical path length $L_n$.

2. The phase modulation method according to claim 1, wherein the phase distribution calculation step further comprises a measurement step of measuring the readout light intensity distribution in the first section including the first optical axis of the readout light which enters the phase modulation plane.

3. The phase modulation method according to claim 1, wherein optical components are not provided on an optical path of the modulated light from the phase modulation plane to the target plane.

4. A phase modulation apparatus comprising:

a light source configured to output readout light of which a readout light intensity distribution in a first section including a first optical axis of the readout light is axially symmetric with respect to the first optical axis;

a spatial light modulator comprising a phase modulation plane including a plurality of two-dimensionally arrayed modulation regions, and configured to modulate the readout light in phase in each of the plurality of modulation regions to generate modulated light; and a phase distribution computation unit configured to calculate a phase distribution to be displayed on the phase modulation plane such that the modulated light has a predetermined intensity distribution on a target plane separated by a predetermined optical distance from the phase modulation plane, wherein the phase distribution computation unit calculates the phase distribution to be displayed on the phase modulation plane by dividing a light entering region on the phase modulation plane which the readout light enters into N (N is an integer of 2 or more) concentric first regions $A_1 \ldots A_N$ centered on the first optical axis of the readout light and setting sizes of the first regions $A_1 \ldots A_N$ such that first integration values of the readout light intensity distribution in the first section including the first optical axis of the readout light, the first integration values being obtained by integrating the readout light intensity distribution in the respective first regions $A_1 \ldots A_N$, are equal to each other, dividing a target region on the target plane into N concentric second regions $B_1 \ldots B_N$ centered on a second optical axis of the modulated light and setting sizes of the second regions $B_1 \ldots B_N$ such that second integration values of a modulated light intensity distribution in a second section including the second optical axis of the modulated light, the second integration values being obtained by integrating the modulated light intensity distribution in the respective second regions $B_1 \ldots B_N$, are equal to each other, obtaining an optical path length $L_n$ from the first region $A_n$ to the second region $B_n$ (n is each integer from 1 to N), and determining a phase of the first region $A_n$ based on the optical path length $L_n$.

5. The phase modulation apparatus according to claim 4, further comprising a measurement section configured to measure the readout light intensity distribution in the first section including the first optical axis of the readout light which enters the phase modulation plane.

6. The phase modulation apparatus according to claim 4, wherein optical components are not provided on an optical path of the modulated light from the phase modulation plane to the target plane.

7. The phase modulation apparatus according to claim 4, further comprising an objective lens disposed on the target plane.

8. A phase modulation apparatus comprising:

a light source configured to output readout light of which a readout light intensity distribution in a first section including a first optical axis of the readout light is axially symmetric with respect to the first optical axis;

a spatial light modulator comprising a phase modulation plane including a plurality of two-dimensionally arrayed modulation regions, and configured to modulate the readout light in phase in each of the plurality of modulation regions to generate modulated light; and a control section configured to control a phase distribution to be displayed on the phase modulation plane such that the modulated light has a predetermined intensity distribution on a target plane separated by a predetermined optical distance from the phase modulation plane, wherein the control section comprises a storage configured to store the phase distribution, and the phase distribution is calculated by dividing a light entering region on the phase modulation plane which the readout light enters into N (N is an integer of 2 or more) concentric first regions $A_1 \ldots A_N$ centered on the first optical axis of the readout light and setting sizes of the first regions $A_1 \ldots A_N$ such that first integration values of the readout light intensity distribution in the first section including the first optical axis of the readout light, the first integration values being obtained by integrating the readout light intensity distribution in the respective first regions $A_1 \ldots A_N$, are equal to each other, dividing a target region on the target plane into N concentric second regions $B_1 \ldots B_N$ centered on a second optical axis of the modulated light and setting sizes of the second regions $B_1 \ldots B_N$ such that second integration values of a modulated light intensity distribution in a second section including the second optical axis of the modulated light, the second integration values being obtained by integrating the modulated light intensity distribution in the respective second regions $B_1 \ldots B_N$, are equal to each other, obtaining an optical path length $L_n$ from the first region $A_n$ to the second region B(n is each integer from 1 to N), and determining a phase of the first region $A_n$ based on the optical path length $L_n$.

9. The phase modulation apparatus according to claim 8, wherein optical components are not provided on an optical path of the modulated light from the phase modulation plane to the target plane.

10. The phase modulation apparatus according to claim 8, further comprising an objective lens disposed on the target plane.

11. A phase modulation method, using a spatial light modulator comprising a phase modulation plane including a plurality of two-dimensionally arrayed modulation regions, for modulating readout light in phase in each of the plurality of modulation regions to generate modulated light, comprising:
a phase distribution calculation step of calculating a phase distribution to be displayed on the phase modulation plane such that the modulated light has a predetermined intensity distribution on a target plane separated by a predetermined optical distance from the phase modulation plane; and
a modulated light generation step of displaying the phase distribution on the phase modulation plane, and causing the readout light to enter the phase modulation plane so as to generate the modulated light, wherein
the phase distribution calculation step comprises:
a first step of dividing a light entering region on the phase modulation plane which the readout light enters into M (M is an integer of 2 or more) first regions $S_1 \ldots S_M$ such that first integration values of a readout light intensity distribution in the respective first regions are equal to each other, and
dividing a target region on the target plane which the modulated light enters into M second regions $R_1 \ldots R_M$ such that second integration values of a modulated light intensity distribution in the respective second regions are equal to each other; and
a second step of calculating the phase distribution by obtaining an optical path length $LB_m$ from the first region $S_m$ to the second region $R_m$ (m is each integer from 1 to M), and determining a phase of the first region $S_m$ based on the optical path length $LB_m$.

12. The phase modulation method according to claim 11, wherein, in the first step, a centroid position of the readout light intensity distribution of the readout light is calculated, and the light entering region on the phase modulation plane is divided into the M first regions $S_1 \ldots S_M$ by dividing in an angular direction in a polar coordinate system which takes the centroid position as a center of coordinates, and
a centroid position of the modulated light intensity distribution on the target plane is calculated, and the target region on the target plane is divided into the M second regions $R_1 \ldots R_M$ by dividing in an angular direction in a polar coordinate system which takes the centroid position as a center of coordinates.

13. A phase modulation apparatus comprising:
a light source configured to output readout light;
a spatial light modulator comprising a phase modulation plane including a plurality of two-dimensionally arrayed modulation regions, and configured to modulate the readout light in phase in each of the plurality of modulation regions to generate modulated light; and
a phase distribution computation unit configured to calculate a phase distribution to be displayed on the phase modulation plane such that the modulated light has a predetermined intensity distribution on a target plane separated by a predetermined optical distance from the phase modulation plane, wherein
the phase distribution computation unit calculates the phase distribution to be displayed on the phase modulation plane by
dividing a light entering region on the phase modulation plane which the readout light enters into M (M is an integer of 2 or more) first regions $S_1 \ldots S_M$ such that first integration values of a readout light intensity distribution in the respective first regions are equal to each other,
dividing a target region on the target plane which the modulated light enters into M second regions $R_1 \ldots R_M$ such that second integration values of a modulation light intensity distribution in the respective second regions are equal to each other,
obtaining an optical path length $LB_m$ from the first region $S_m$ to the second region $R_m$ (m is each integer from 1 to M), and determining a phase of the first region $S_m$ based on the optical path length $LB_m$.

14. The phase modulation apparatus according to claim 13, wherein the phase distribution computation unit calculates a centroid position of the readout light intensity distribution of the readout light, divides the light entering region on the phase modulation plane into the M first regions $S_1 \ldots S_M$ by dividing in an angular direction in a polar coordinate system which takes the centroid position as a center of coordinates,
calculates a centroid position of the modulated light intensity distribution on the target plane, and divides the target region on the target plane into the M second regions $R_1 \ldots R_M$ by dividing in an angular direction in a polar coordinate system which takes the centroid position as a center of coordinates.

15. A phase modulation apparatus comprising:
a light source configured to output readout light;
a spatial light modulator comprising a phase modulation plane including a plurality of two-dimensionally arrayed modulation regions, and configured to modulate the readout light in phase in each of the plurality of modulation regions to generate modulated light; and
a control section configured to control a phase distribution to be displayed on the phase modulation plane such that the modulated light has a predetermined intensity distribution on a target plane separated by a predetermined optical distance from the phase modulation plane, wherein
the control section comprises a storage configured to store the phase distribution, and
the phase distribution is calculated by
dividing a light entering region on the phase modulation plane which the readout light enters into M (M is an integer of 2 or more) first regions $S_1 \ldots S_M$ such that first integration values of a readout light intensity distribution in the respective first regions are equal to each other,
dividing a target region on the target plane which the modulated light enters into M second regions $R_1 \ldots R_M$ such that second integration values of a modulated light intensity distribution in the respective second regions are equal to each other,
obtaining an optical path length $LB_m$ from the first region $S_m$ to the second region $R_m$ (m is each integer from 1 to M), and determining a phase of the first region $S_m$ based on the optical path length $LB_m$.

16. The phase modulation apparatus according to claim 15, wherein, for the phase distribution, a centroid position of the readout light intensity distribution of the readout light is calculated, the light entering region on the phase modulation plane is divided into the M first regions $S_1 \ldots S_M$ by dividing in an angular direction in a polar coordinate system which takes the centroid position as a center of coordinates,
a centroid position of the modulated light intensity distribution on the target plane is calculated, and the target region on the target plane is divided into the M second regions $R_1 \ldots R_M$ by dividing in an angular direction in a polar coordinate system which takes the centroid position as a center of coordinates.

* * * * *